(12) United States Patent
Stewart et al.

(10) Patent No.: US 7,064,506 B2
(45) Date of Patent: Jun. 20, 2006

(54) SYSTEM AND METHOD FOR POWER SEAT MOTOR CONTROL

(75) Inventors: Robert A. Stewart, South Lyon, MI (US); Eric K. Honsowetz, Saline, MI (US); Stephen A. Harrison, Monroe, MI (US); Mark Alan Jay, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/876,129

(22) Filed: Jun. 24, 2004

(65) Prior Publication Data

US 2005/0285551 A1 Dec. 29, 2005

(51) Int. Cl.
*H02P 7/00* (2006.01)

(52) U.S. Cl. .................. 318/293; 318/280; 318/285; 318/286; 701/49; 388/907.2

(58) Field of Classification Search ........ 318/280–286, 318/293, 294, 101–104; 701/49; 307/11, 307/12, 38
See application file for complete search history.

(56) References Cited

U.S. PATENT DOCUMENTS

| | | | |
|---|---|---|---|
| 4,257,569 A | 3/1981 | Budinski | |
| 4,379,539 A | 4/1983 | Rion et al. | |
| 5,791,622 A | 8/1998 | Gauger | |
| 5,847,524 A * | 12/1998 | Erdman et al. | 318/439 |
| 5,894,207 A * | 4/1999 | Goings | 318/478 |
| 5,938,164 A | 8/1999 | Kargol et al. | |
| 6,056,257 A | 5/2000 | Jaisle et al. | |
| 6,316,892 B1 * | 11/2001 | Valencia | 318/293 |
| 6,497,267 B1 * | 12/2002 | Azar et al. | 160/310 |
| 6,559,615 B1 * | 5/2003 | Sethi | 318/565 |
| 6,626,064 B1 * | 9/2003 | Maue et al. | 74/665 F |
| 6,639,370 B1 * | 10/2003 | Gabrys | 318/161 |

FOREIGN PATENT DOCUMENTS

JP 2001275374 A * 10/2001

* cited by examiner

*Primary Examiner*—Marlon Fletcher
*Assistant Examiner*—Eduardo Colon Santana
(74) *Attorney, Agent, or Firm*—Brooks Kushman P.C.

(57) ABSTRACT

A method for controlling a vehicle power seat motor including the steps of generating at least one control signal using a controller, and adjusting the speed of the motor in response to the at least one control signal such that speed of the motor is maintained to a predetermined curve. Maintaining the speed of the motor to the predetermined curve reduces at least one of mechanical wear, erratic motion, and noise of a respective seat mechanism.

15 Claims, 2 Drawing Sheets

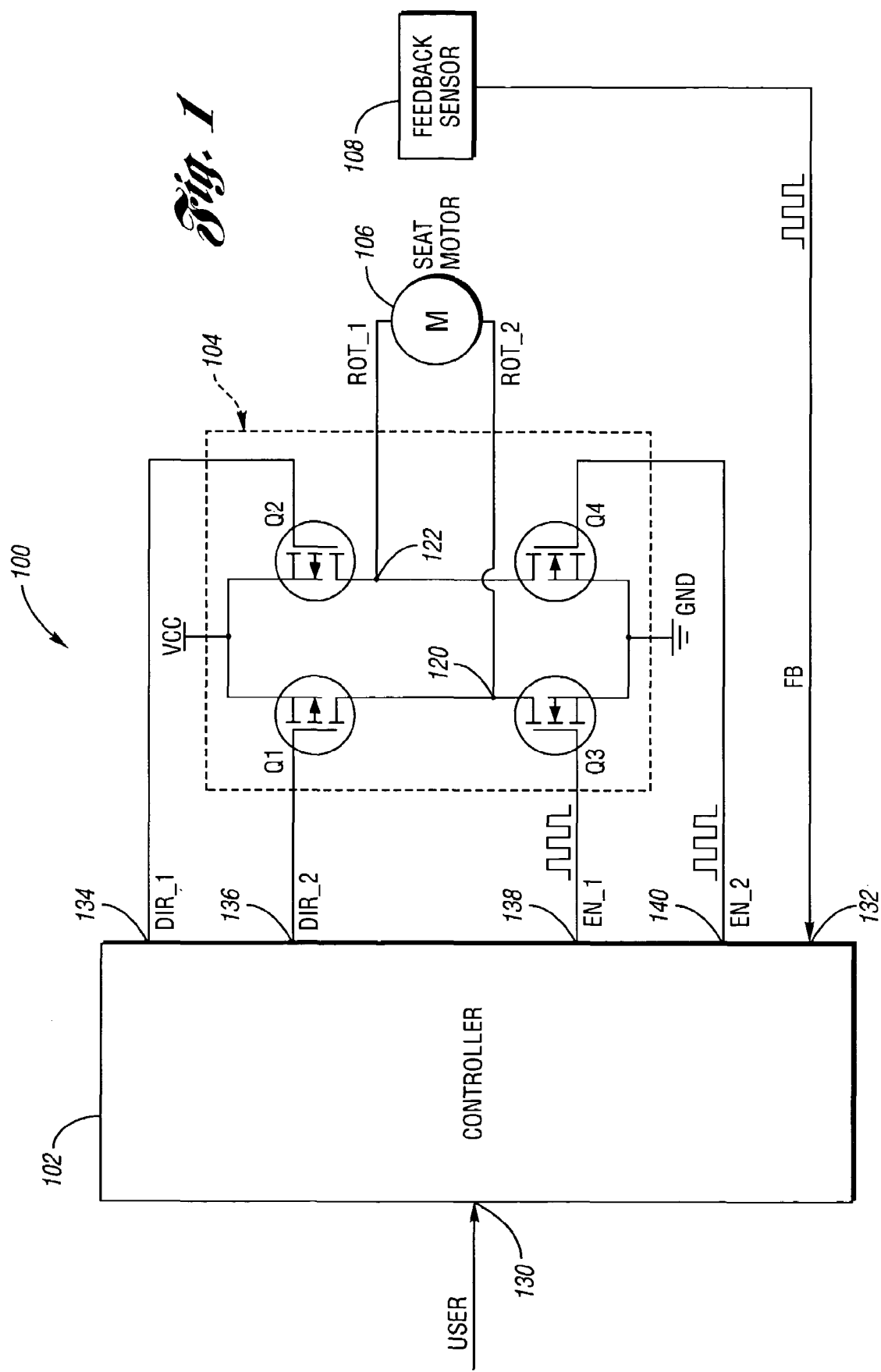

SYSTEM AND METHOD FOR POWER SEAT MOTOR CONTROL

BACKGROUND OF THE INVENTION

1. Field of the Invention

This invention relates to a system and a method for power seat motor control.

2. Background

Many vehicles have seats that are adjustable by an occupant. At a minimum, the occupant is usually able to raise and lower the height of the seat relative to the vehicle floor as well as traverse the seat forward and backward relative to the front of the vehicle.

One or more motors are often used as part of the seat adjustment mechanism so that the motion can be performed with minimal effort on the part of the occupant. Conventional seat adjustment mechanisms implement on/off motor control circuitry. As such, the motors are not ramped up to speed or brought to a stop in a controlled manner. The lack of a controlled start and stop can result in undue wear on the seat hardware as well as the occupant experiencing a jerking sensation during seat motion starting and stopping.

In addition, conventional seat adjustment mechanisms do not regulate the speed of the motors while the seat is in motion. As such, the seat speed during motion does not remain constant but, in fact, can fluctuate depending upon such factors as the weight of the occupant, ambient temperature, seat track friction, and the like. The inability to maintain a constant seat speed can result in the occupant experiencing jerky motion, and excessive noise. The seat hardware can also experience undue wear as a result of the fluctuation in seat speed during position adjustment.

While many mechanical designs have been proposed in an effort to address these problems, the problems remain unsolved. Thus, it would be desirable to have a method and system for controlling seat motors that would reduce or eliminate seat noise, jerky seat motion, and wear on the seat mechanisms.

SUMMARY OF THE INVENTION

Accordingly, the present invention provides a system and method for controlling vehicle seat motors while the vehicle seat is in motion.

According to the present invention, a method for controlling a vehicle power seat motor is provided. The method comprises generating at least one control signal using a controller, and adjusting the speed of the motor in response to the at least one control signal such that the speed of the motor is maintained to a predetermined curve. Maintaining the speed of the motor to the predetermined curve reduces at least one of mechanical wear, erratic motion, and noise of a respective seat mechanism.

Also according to the present invention, a system for controlling a vehicle power seat motor is provided. The system comprises a controller, a control circuit, and a motor. The controller is configured to present at least one control signal. The control circuit is configured to present at least one motor speed control signal in response to a respective at least one of the control signals. The motor is configured to have motion in at least one direction in response to a respective at least one of the motor speed control signals. The speed of the motor is maintained to a predetermined curve having a ramp up segment, a steady state segment, and a ramp down segment. Maintaining the speed of the motor reduces at least one of mechanical wear, erratic motion and noise of the respective seat mechanism.

Still further according to the present invention, a system for controlling a vehicle power seat motor is provided. The system comprises a controller, a control circuit, a feedback sensor, and a motor. The controller is configured to present at least one control signal in response to a user demand. The control circuit is configured to present at least one motor speed signal in response to a respective at least one of the control signals. The feedback sensor is configured to present at least one feedback signal in response to motion of the motor. At least one feedback signal is received by the controller and modifies the at least one control signal. The motor is configured to have motion in at least one direction in response to a respective at least one of the motor speed signals. The speed of the motor is maintained to a predetermined curve having a ramp up segment, a steady state segment, and a ramp down segment. Maintaining the speed of the motor reduces at least one of mechanical wear, erratic motion and noise of the respective seat mechanism.

These and other features and advantages of the present invention will be readily apparent upon consideration of the following detailed description of the invention in conjunction with the accompanying drawings.

BRIEF DESCRIPTION OF THE DRAWINGS

FIG. 1 is a diagram of a system for controlling a motor of the present invention.

DETAILED DESCRIPTION OF THE PREFERRED EMBODIMENT(S)

Figure 2A:
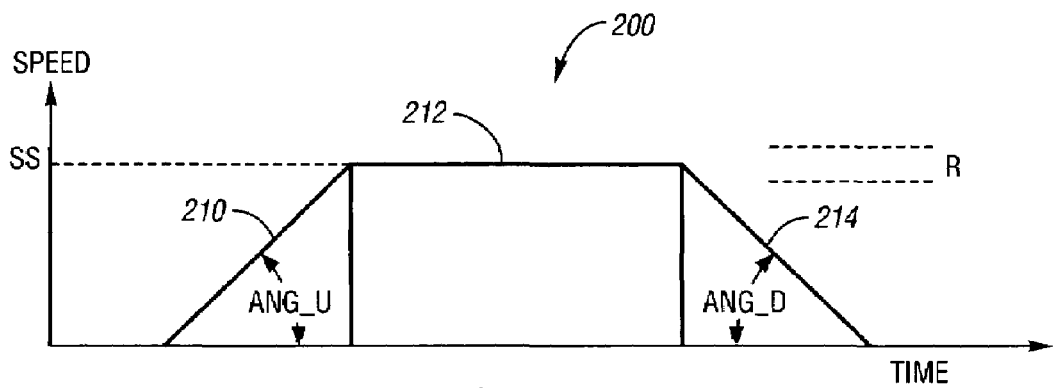
FIGS. 2($a$–$c$) are plots of speed versus time for various modes of operation of the present invention.

Referring to FIG. 1, a diagram illustrating a vehicle seat motor control system 100 of the present invention is shown. The motor control system 100 generally comprises a controller (e.g., microcontroller, microprocessor, processor, and the like) 102, control circuit (e.g., H-bridge) 104, a motor 106, and a feedback sensor 108. The system 100 may be implemented as a closed loop control system and is generally implemented in connection with a respective seat mechanism (not shown).

The controller 102 may have an input 130 that may receive a user demand signal or command (e.g., USER), an input 132 that may receive a signal (e.g., FB), an output 134 that may present a signal (e.g., DIR_1), an output 136 that may present a signal (e.g., DIR_2), an output 138 that may present a signal (e.g., EN_1), and an output 140 that may present a signal (e.g., EN_2). The controller 102 generally interfaces with (i.e., is coupled to) the control circuit 104 and the feedback sensor 108. The microcontroller 102 generally contains a software algorithm (e.g., method, process, routine, steps, blocks, etc.) to read the sensor 108 and adjust (i.e., modify, change, etc.) the seat motion control signals (e.g., the signals DIR_1, DIR_2, EN_1, and EN_2) accordingly.

The signal USER is generally a control signal that is presented when the user desires movement of the seat mechanism. The controller 102 may be configured to generate at least one output control signal (e.g., at least one of the signals DIR_1, DIR_2, EN_1, and EN_2) in response to the signal USER. In one example, the signal USER may be generated when a user actuates a toggle switch. In another example, the signal USER may be generated when a user actuates a push button. In yet another example, the signal USER may be generated by another controller. However, the signal USER may be any appropriate control signal to meet the design criteria of a particular application.

The signal FB is generally a control signal that provides information to the controller 102 regarding the motor 106. The signal FB may be generated by the feedback sensor 108 in response to motion (e.g., rotation, movement, etc.) of the motor 106. In one example, the signal FB may indicate the position of a component (e.g., shaft, gear assembly, etc.) of the motor 106. In another example, the signal FB may indicate the angular velocity (i.e., rotational speed) of the motor 106. However, the signal FB may indicate any appropriate parameter (i.e., value, characteristic, factor, etc.) to meet the design criteria of a particular application.

The signal DIR_1 may be a control signal that may control whether the motor 106 rotates in a first direction (i.e., when the control signal DIR_1 is active (e.g., high, "on", digital 1, true, enabled, etc.) the motor 106 generally rotates in the first direction).

The signal DIR_2 may be a control signal that may control whether the motor 106 rotates in a second direction (i.e., when the control signal DIR_2 is active (e.g., high, "on", digital 1, true, enabled, etc.) the motor 106 generally rotates in the second direction generally opposite of the first direction).

The signals EN_1 and EN_2 may be control signals that may control the speed of the motor 106 when the signals DIR_1 and DIR_2, respectively, are active. The signals EN_1 and EN_2 may be implemented to maintain (i.e., hold) at least one of the ramp up, steady state, and ramp down speed curves of the motor 106 to predetermined values (e.g., curves, levels, amounts, etc.). In one example, the signals EN_1 and EN_2 may be implemented as pulse width modulated signals that adjust (i.e., modify, set, maintain, hold, etc.) the duty cycle of electric current to the motor 106. In another example, the signals EN_1 and EN_2 may be implemented as voltage amplitude (or level) modulated signals. In yet another example, the signals EN_1 and EN_2 may be implemented as current amplitude modulated signals. However, the signals EN_1 and EN_2 may be of any format appropriate to control power to the motor 106 to meet the design criteria of a particular application.

The H-bridge 104 generally comprises transistors Q1, Q2, Q3, Q4, a node 120, and a node 122. In one example, the transistors Q1, Q2, Q3, and Q4 may be implemented as power MOSFETs. However, the transistors Q1, Q2, Q3, and Q4 may be implemented as any appropriate switching devices to meet the design criteria of a particular application.

The transistor Q1 may have a gate that may receive the signal DIR_2, a source that may receive a power supply voltage (e.g., VCC), and a drain that may be connected to the node 120. The transistor Q2 may have a gate that may receive the signal DIR_1, a source that may receive the voltage VCC, and a drain that may be connected to the node 122. The transistor Q3 may have a gate that may receive the signal EN_1, a source that may receive a power supply ground (e.g., GND), and a drain that may be connected to the node 120. The transistor Q4 may have a gate that may receive the signal EN_2, a source that may receive the ground GND, and a drain that may be connected to the node 122.

The node 120 may present a motor speed control signal (e.g., ROT_2) to a first terminal of the motor 106. The node 122 may present a motor speed control signal (e.g., ROT_1) to a second terminal of the motor 106. Electrical power is generally supplied (i.e., transmitted, presented, etc.) to the motor 106 via the signals ROT_1 and ROT_2. The motor 106 may rotate in the first direction when the control signal ROT_1 is active. The motor 106 may rotate in the second direction when the control signal ROT_2 is active. The RMS electric power of the signals ROT_1 and ROT_2 is generally directly proportional to the RMS value of the signals EN_1 and EN_2, respectively.

The feedback sensor 108 may generate the signal FB in response to motion (e.g., rotation, linear motion, displacement, etc.) of at least one component of the motor 106, or a seat mechanism, or components related to the motion of the seat. In one example, the sensor 108 may be a Hall effect sensor and the signal FB may be a pulsed signal. In another example, the sensor 108 may be a magnetic pickup sensor and the signal FB may be a wave that varies in amplitude and wave shape. In yet another example, the sensor 108 may be a photodiode and receptor device and the signal FB may be a signal that varies in amplitude.

In yet another example, the sensor 108 may be an encoder and the signal FB may be a pulsed feedback signal. In yet another example, the sensor 108 may be a resolver and the signal FB may be comprised of two sinusoidal waves. However, the sensor 108 may be implemented as any appropriate motion detection device (or sensor) to meet the design criteria of a particular application. The signal FB may be presented in any respective format appropriate to meet the design criteria of a particular application.

The rotational direction and speed of the motor 106 is generally controlled in response to the control signals DIR_1, DIR_2, EN_1, and EN_2. The motor 106 generally rotates in a first direction when the control signal DIR_1 is active (e.g., high, "on", digital 1, true, enabled, etc.) and the control signal DIR_2 is inactive (e.g., low, "off", digital 0, false, disabled, etc.). The motor 106 generally rotates in a second direction (i.e., a direction that is generally opposite to the first direction) when the control signal DIR_2 is active and the control signal DIR_1 is inactive.

The control signal EN_1 may control the speed of the motor 106 when the motor 106 is rotating in the first direction (i.e., when the signal DIR_1 is active and the signal DIR_2 is inactive). The control signal EN_2 may control the speed of the motor 106 when the motor 106 is rotating in the second direction (i.e., when the signal DIR_2 is active and the signal DIR_1 is inactive).

Referring to FIG. 2a, a motor speed versus time plot 200 for one example mode of operation of the present invention is shown. The speed curve 200 generally comprises a ramp up segment (i.e., section, portion, etc.) 210, a steady state segment 212 and a ramp down segment 214. The vehicle seat motion control system 100 of the present invention may be implemented to control motion of a seat (i.e., control operation of a motor such as the motor 106) such that speed of a motor (e.g., the motor 106) is maintained to the curve 200. Alternatively, the control system 100 may be implemented to maintain the speed of the motor 106 to substantially at least one of the curve 200' and the curve 200" illustrated in FIGS. 2(b–c), and described in detail below.

The ramp up segment 210 generally has an increasing speed and a constant rate of acceleration. The rate of acceleration of the segment 210 may be such that the speed curve has a slope angle (e.g., ANG_U) of nominally 45 degrees, having a preferred range of 30 degrees to 60 degrees and a most preferred range of 40 degrees to 50 degrees. Furthermore, variation of the motor acceleration from the general constant rate of acceleration may be maintained within a predetermined tolerance range.

The steady state segment 212 generally has a substantially constant rate of speed (e.g., SS). Variation from the essentially constant rate of speed SS may be maintained within a tolerance (e.g., R). The tolerance R may be centered around the general constant rate of speed SS or may be skewed up or down to meet the design criteria of a particular application. The tolerance R may have a nominal span of 20% and a preferred span of 10% of the general constant rate of speed SS. However, the span of the tolerance R may be any appropriate value and range to meet the design criteria of a particular application.

The ramp down segment 214 generally has a decreasing speed and a constant rate of deceleration. The rate of deceleration may be such that the speed curve has a slope angle (e.g., ANG_D) of nominally 45 degrees, having a preferred range of 30 degrees to 60 degrees and a most preferred range of 40 degrees to 50 degrees. Furthermore, variation of the motor deceleration from the general constant rate of deceleration may be maintained within the predetermined tolerance range.

Figure 2B:
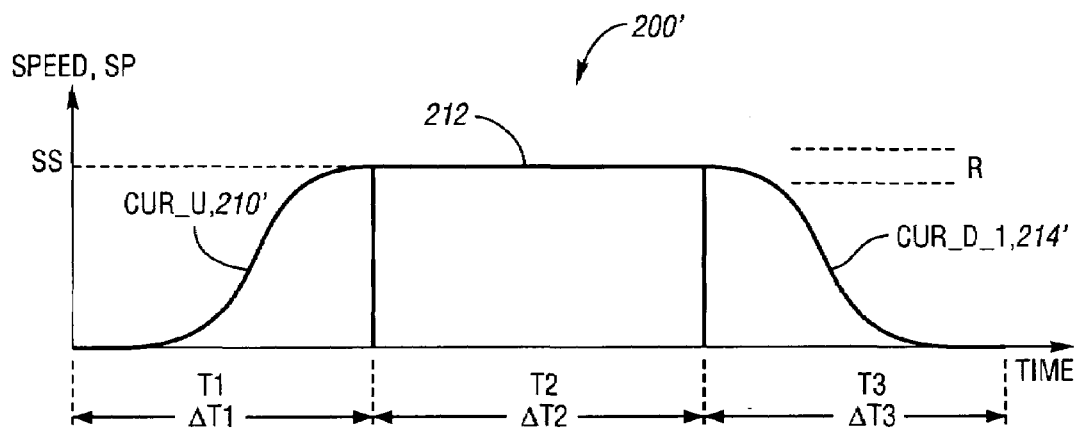

Referring to FIG. 2b, a motor speed versus time plot 200' for another example mode of operation of the present invention is shown. The speed curve 200' generally comprises a ramp up segment 210', the steady state segment 212, and a ramp down segment 214'.

The ramp up segment 210' generally follows an S-curve (e.g., CUR_U). The S-curve CUR_U may be determined (e.g., calculated, derived, etc.) by the equation $SP_U=(T1/(T1+exp(B-C*T1)))*(SS)$. The parameter T1 is generally the time as measured from the start of the ramp up segment 210' (i.e., a duration of operation of the motor 106) to the end of the segment 210'. The values B and C are generally selected (i.e., predetermined, chosen, set, etc.) as appropriate values (i.e., parameters, factors, constants, etc.) to meet the design criteria of a particular application. The parameter $SP_U$ is generally the motor speed at a particular point in time (i.e., T1). The parameter SS may be the predetermined steady state speed of the motor 106.

The ramp down segment 214' substantially follows an S-curve (e.g., CUR_D_1). The S-curve CUR_D_1 may be determined (e.g., calculated, derived, etc.) by the equation $SP_D=(-T3/(T3+exp(D-E*T3)))+F$. The parameter T3 is generally the time as measured from the start of the ramp down segment 214' to the end of the segment 214' (i.e., the duration of operation of the motor 106 minus ΔT2 (i.e., the duration of the steady state segment 212) minus ΔT1 (i.e., the duration of the ramp up segment 210')). The parameter $SP_D$ is generally the motor speed at a particular point in time (i.e., T3). The parameter F is generally the speed of the motor 106 immediately preceding ramp down (e.g., SS). The values D and E are generally selected as appropriate values (i.e., parameters, factors, constants, etc.) such that the ramp down curve CUR_D_1 substantially mirrors the ramp up curve CUR_U. However, D and E may be selected as any appropriate values (i.e., parameters, factors, constants, etc.) to meet the design criteria of a particular application.

Figure 2C:
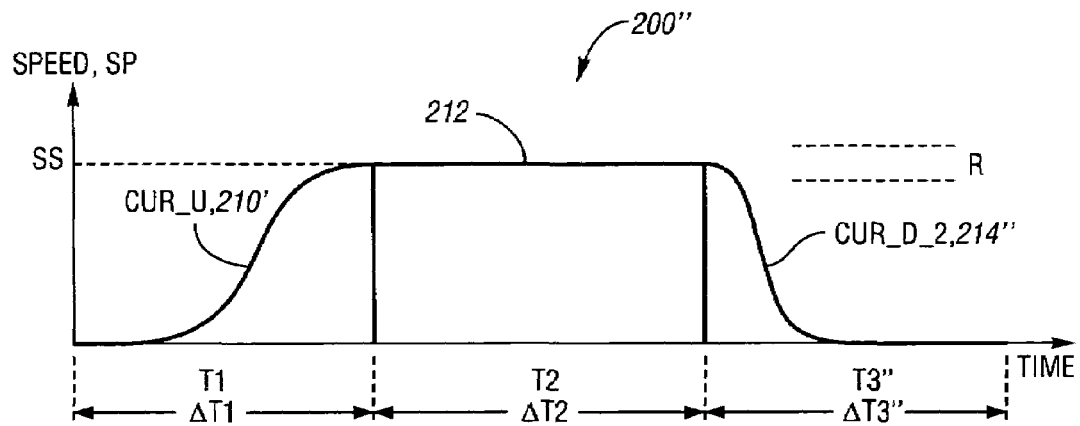

Referring to FIG. 2c, a motor speed versus time plot 200" for yet another example mode of operation of the present invention is shown. The speed curve 200" generally comprises the ramp up segment 210', the steady state segment 212, and a ramp down segment 214".

The ramp down segment 214" substantially follows an S-curve (e.g., CUR_D_2). The S-curve CUR_D_2 may be determined (e.g., calculated, derived, etc.) by the equation $SP_D"=(-T3"/(T3"+exp(D"-E"*T3")))+F"$. The parameter T3" is generally the time as measured from the start of the ramp down segment 214" to the end of the segment 214" (i.e., the duration of operation of the motor 106 minus ΔT2 (i.e., the duration of the steady state segment 212) minus ΔT1 (i.e., the duration of the ramp up segment 210')). The parameter $SP_D"$ is generally the motor speed at a particular point in time (i.e., T3"). The parameter F" is generally the speed of the motor immediately preceding ramp down (e.g., SS). The values D" and E" are generally selected as appropriate values (i.e., parameters, factors, constants, etc.) to make the ramp down curve CUR_D_2 approach zero speed at a greater rate than the curve CUR_U approached the steady state speed SS. However, D" and E" may be selected as any appropriate values (i.e., parameters, factors, constants, etc.) to meet the design criteria of a particular application.

The various digital signals (e.g., at least one of the signals DIR_1, DIR_2, EN_1, and EN_2) may be presented as "on" (i.e., asserted) as a digital True, HIGH, or 1 state, and "off" (i.e., de-asserted) as a digital False, LOW, or 0 state. However, the "on" and "off" conditions of the signals may be presented as any appropriate state, level, value, or condition to meet the design criteria of a particular application.

As is apparent then, the present invention generally provides a system (e.g., the system 100) and a method for the control of the motion (i.e., movement) of a vehicle seat. The system and method of the present invention generally control the speed of a motor that is implemented in connection with the vehicle seat such that speed of the motor is substantially maintained to a predetermined curve. The improved system and method of the present invention generally provides reduced seat noise, smoother seat motion and reduced wear on the seat mechanisms when compared to conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method for controlling a vehicle power seat motor, the method comprising:

generating at least one control signal using a controller; and adjusting the speed of a motor coupled to a vehicle seat mechanism in response to the at least one control signal such that the speed of the motor is maintained to a predetermined curve, the predetermined curve comprising a ramp up segment, a steady state segment, and a ramp down segment, the ramp up segment substantially following an S-curve described by an equation $SP=(T/(T+exp(B-C*T)))*(SS)$, wherein B and C are predetermined constants, SP is speed of the motor at a particular point in time during the ramp up segment, SS is the speed of the motor during the steady state segment, and T is time referenced to start of the ramp up segment and wherein maintaining the speed of the motor to the predetermined curve reduces at least one of mechanical wear, erratic motion, and noise of the respective seat mechanism.

2. The method of claim 1 wherein the controller generates the at least one control signal in response to a user demand.

3. The method of claim 1 wherein the at least one control signal is at least one of a pulse width modulated signal, a voltage amplitude modulated signal, and a current amplitude modulated signal.

4. The method of claim 1 wherein the at least one control signal is modified in response to a feedback signal received by the controller and wherein the feedback signal is generated by at least one of a Hall effect sensor, a magnetic pickup sensor, a photodiode, an encoder, and a resolver.

5. The method of claim 1 wherein the steady state segment has a substantially constant rate of speed, and the substantially constant rate of speed is maintained within a predetermined tolerance in response to a feedback signal.

6. The method of claim 1 wherein the ramp down segment substantially follows an S-curve, wherein the S-curve is described by an equation $SP=(-T/(T+\exp(D-E*T)))+F$, wherein D and E are predetermined constants, SP is speed of the motor at a particular point in time during the ramp down segment, F is the speed of the motor immediately preceding the ramp down segment, and T is time is referenced to start of the ramp down segment.

7. The method of claim 6 wherein the S-curve of the ramp down segment substantially mirrors the S-curve of the ramp up segment.

8. The method of claim 6 wherein the S-curve of the ramp down segment approaches zero speed at a faster rate than the ramp up curve approaches steady state speed.

9. A system for controlling a vehicle power seat motor, the system comprising:
   a controller configured to present at least one control signal;
   a control circuit configured to present at least one motor speed control signal in response to a respective at least one of the control signals; and
   a motor coupled to a vehicle seat mechanism, the motor configured to have motion in at least one direction in response to a respective at least one of the motor speed control signals,
   wherein speed of the motor is maintained to a predetermined curve having a ramp up segment, a steady state segment, and a ramp down segment, the ramp up segment substantially following an S-curve described by an equation $SPu=(T1/(T1+\exp(B-C*T1)))*(SS)$ and the ramp down segment substantially following an S-curve described by an equation $SPd=(-T3/(T3+\exp(D-E*T3)))+F$,
   wherein B, C, D and E are predetermined constants, SPu is speed of the motor at a particular point in time during the ramp up segment, SPd is speed of the motor at a particular point in time during the ramp down segment, SS is the speed of the motor during the steady state segment, T1 is time referenced to start of the ramp up segment, F is the speed of the motor immediately preceding the ramp down segment, and T3 is time referenced to start of the ramp down segment, and
   wherein maintaining the speed of the motor reduces at least one of mechanical wear, erratic motion and noise of the respective seat mechanism.

10. The system of claim 9 wherein the steady state segment has a constant rate of speed, and the constant rate of speed is maintained within a predetermined tolerance in response to a feedback signal.

11. The system of claim 9 wherein the S-curve of the ramp down segment substantially mirrors the S-curve of the ramp up segment.

12. The system of claim 9 wherein the S-curve of the ramp down segment approaches zero speed at a faster rate than the ramp up curve approaches steady state speed.

13. The system of claim 9 further comprising a feedback sensor configured to present at least one feedback signal in response to motion of the motor, wherein the at least one feedback signal is received by the controller and adjusts the at least one control signal.

14. The system of claim 9 wherein the controller is configured to present the at least one control signal in response to a user demand.

15. A system for controlling a vehicle power seat motor, the system comprising:
   a controller configured to present at least one control signal;
   a control circuit configured to present at least one motor speed control signal in response to a respective at least one of the control signals; and
   a motor configured to have motion in at least one direction in response to a respective at least one of the motor speed control signals,
   wherein speed of the motor is maintained to a predetermined curve having:
      a steady state segment,
      a ramp up segment substantially following a S-curve, the S-curve described by an equation $SPu=(T1/(T1+\exp(B-C*T1)))*(SS)$, wherein B and C are predetermined constants, SPu is speed of the motor at a particular point in time during the ramp up segment, SS is the speed of the motor during the steady state segment, and T1 is time referenced to start of the ramp up segment, and
      a ramp down segment,
   wherein maintaining the speed of the motor reduces at least one of mechanical wear, erratic motion and noise of a respective seat mechanism.

* * * * *